United States Patent
Ziegler

[19]

[11] Patent Number: 5,530,311
[45] Date of Patent: Jun. 25, 1996

[54] FACE TYPE COMMUTATOR WITH SIDEWAYS TANGS AND A METHOD OF MAKING THE COMMUTATOR

[75] Inventor: William E. Ziegler, Reading, Mass.

[73] Assignee: McCord Winn Textron, Inc., Winchester, Mass.

[21] Appl. No.: 248,368

[22] Filed: May 24, 1994

[51] Int. Cl.$^6$ .................................................. H02K 13/04
[52] U.S. Cl. .......................... 310/237; 310/234; 310/235
[58] Field of Search ..................................... 310/237, 233, 310/234, 235, 51; 29/597

[56] References Cited

U.S. PATENT DOCUMENTS

| | | |
|---|---|---|
| 3,486,056 | 12/1969 | Vuillemot ........................ 310/310 M X |
| 3,735,171 | 5/1973 | Van De Griend . |
| 4,525,957 | 7/1985 | Daniels . |
| 4,855,632 | 8/1989 | Baines . |
| 5,003,212 | 3/1991 | Ibe et al. . |
| 5,008,577 | 4/1991 | Wang . |
| 5,189,329 | 2/1993 | Strobl . |

Primary Examiner—R. Skudy
Attorney, Agent, or Firm—Reising, Ethington, Barnard and Perry

[57] ABSTRACT

A face type commutator (10) includes a hat shaped member (12) and an insulator hub (14) with an armature axis of rotation (22). The hat shaped member (12) has a plate portion (24) with a brush contact surface (26) in a plane perpendicular to the axis of rotation (22) and a cylindrical portion (16) that extends axially from the brush contact surface and defines a cavity (46). The hub (14) fills the cavity (46) and slots (42) in the cylindrical portion (16). Grooves (70) divide the plate portion (24) into a plurality of collector segments (72). A cylindrical sealing surface (76) is formed on the cylindrical portion (16) and portions of the hub (14) below the grooves (70). Tangs (30) integral with the cylindrical portion (16) below the cylindrical sealing surface (76) each have a radially extending leg portion (32) and a foot portion (34) that extends circumferentially from both sides of the leg portion to hold armature coil wires (40) on the leg portion. The tangs (30) are formed from a cylindrical rim portion (130) that extends radially from the cylindrical portion (16).

10 Claims, 4 Drawing Sheets

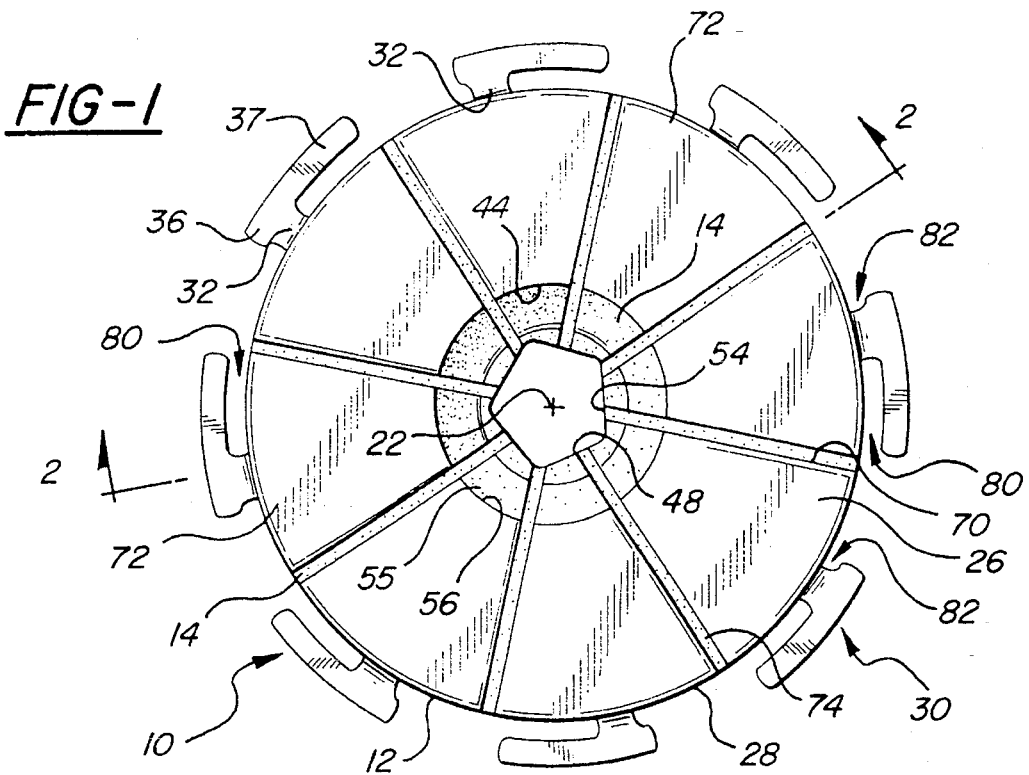
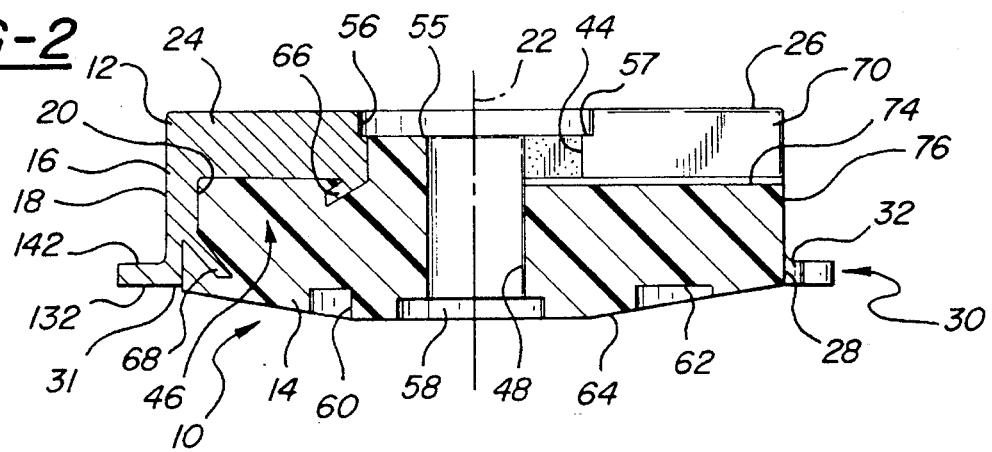
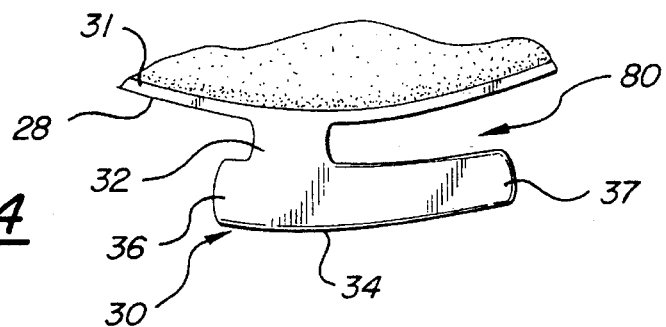

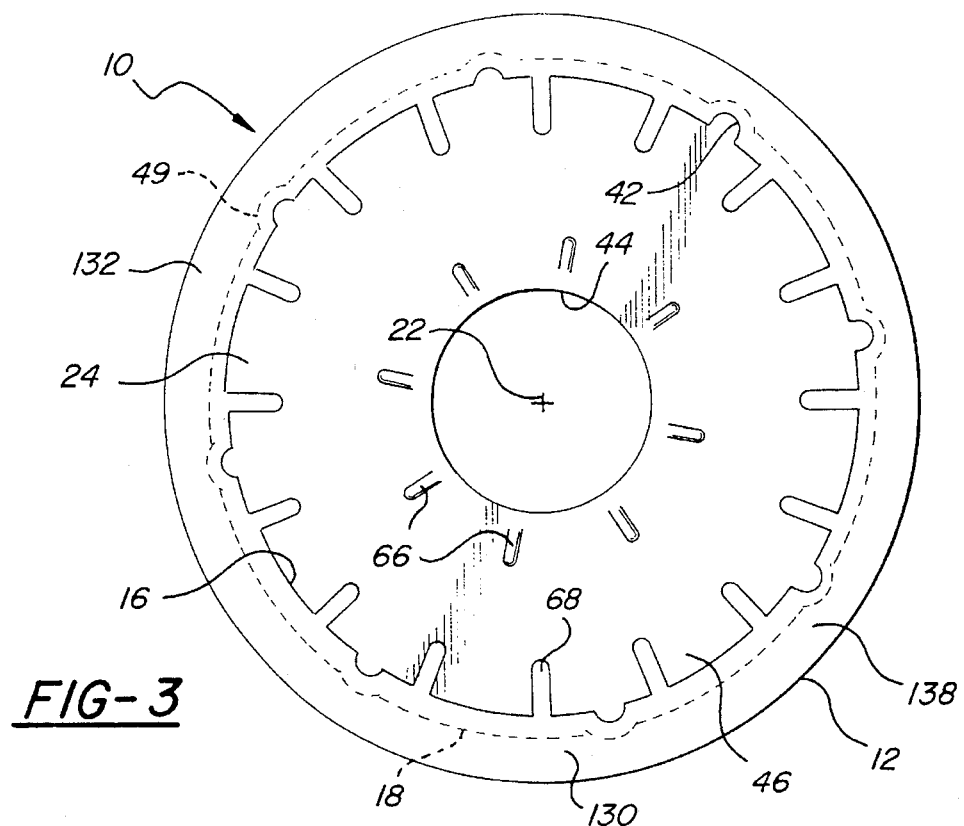
FIG-3
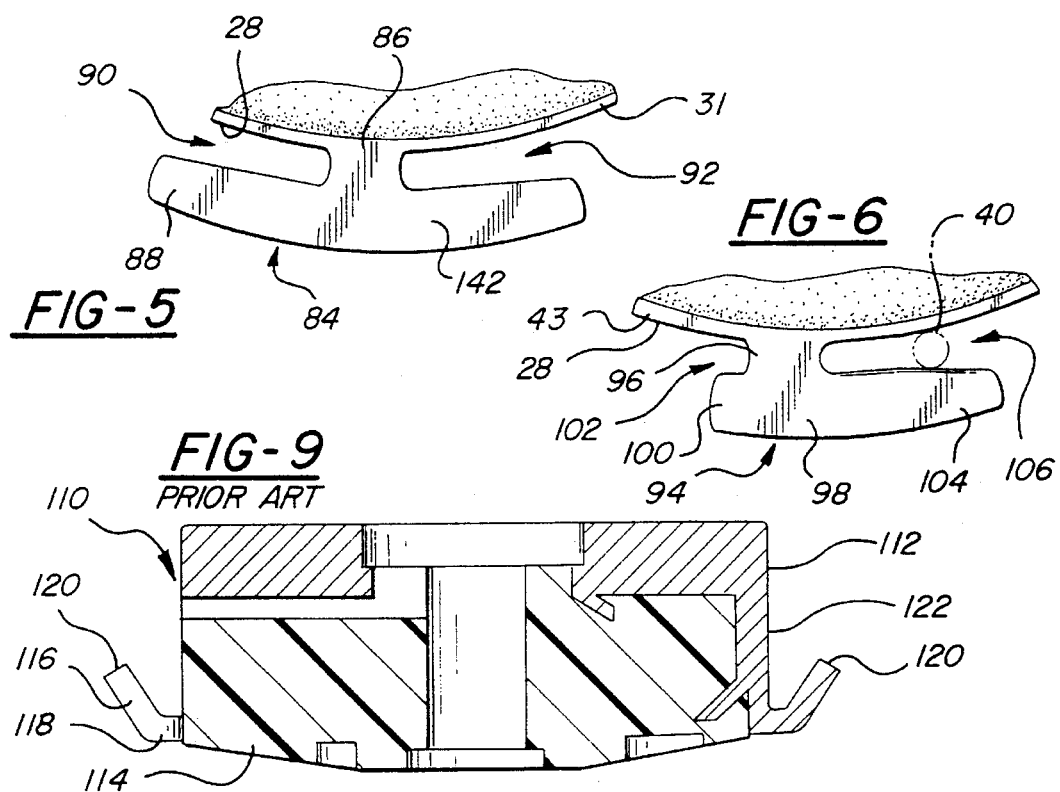
FIG-5
FIG-6
FIG-9
PRIOR ART

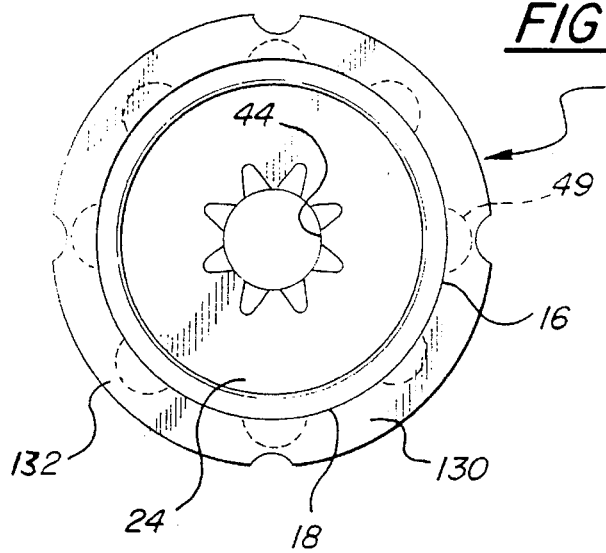
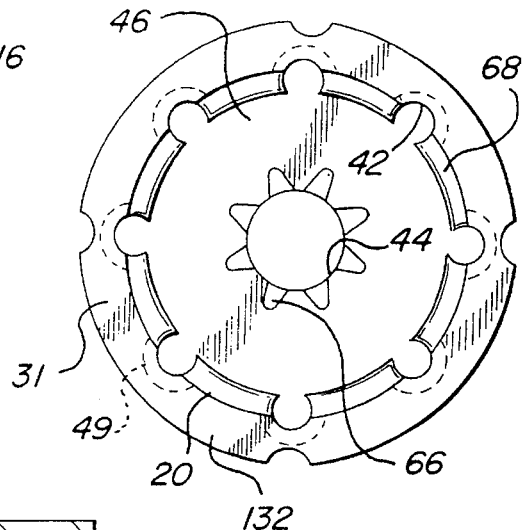
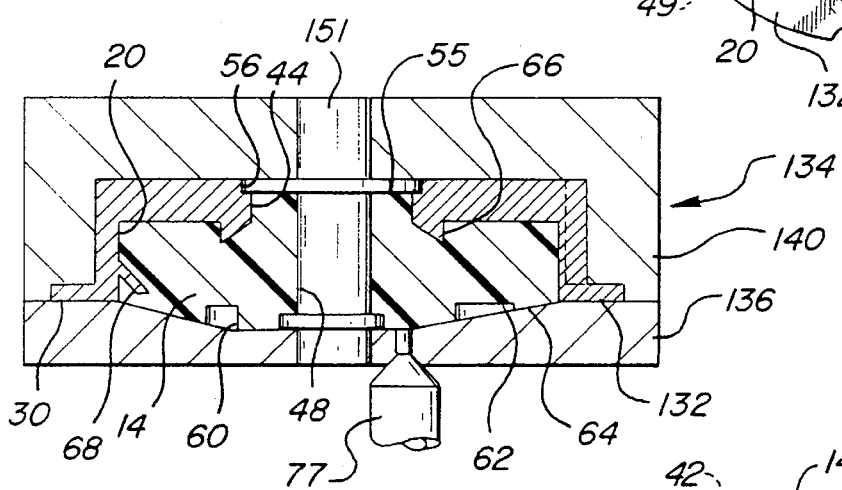
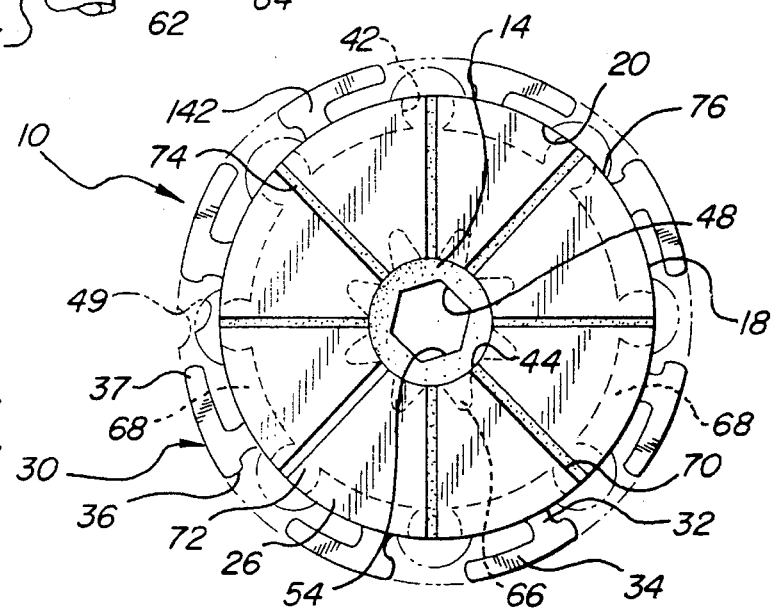

FACE TYPE COMMUTATOR WITH SIDEWAYS TANGS AND A METHOD OF MAKING THE COMMUTATOR

TECHNICAL FIELD

This invention relates to a commutator for a permanent magnet direct current motor and more particularly to a face type commutator with sideways tangs for the connection of armature windings to the commutator.

BACKGROUND OF THE INVENTION

Permanent magnet direct current motors with face type commutators are used for submerged fuel pump applications in automotive vehicles and other applications. These electric motors must be small and compact, have a long life, operate in a corrosive environment, be economical to manufacture and operate and be essentially maintenance free.

There are face type commutators which have tangs for the connection of armature windings to the commutator that extend radially outward from the side of commutator and are bent axially upward away from the armature windings. This arrangement requires substantial axial space for the commutator thereby increasing the length of the armature and commutator and or reducing the size of the wire and the quantity of wire on the armature.

Another face type commutator has tangs located in a plane perpendicular to the axis of armature rotation as shown in U.S. Pat. No. 3,735,171. With this arrangement of the tangs and commutator segments the tangs are heat staked, as required in some armatures. The procedures employed for making the electrical connection between commutators and coil leads include welding and heat staking. For heat staking to be employed the tangs must be relatively thick material. If thin section tangs are employed as in the case of the U.S. Pat. No. 3,735,171, it is necessary to bond the wires of the armature coils to the tangs by solder or by an adhesive or some similar procedure that will not assure a firm and durable mechanical connection between the winding leads and the commutator segments.

SUMMARY OF THE INVENTION

An object of the invention is to provide a commutator with tangs, in a plane perpendicular to an armature rotation axis, for the electrical connection of armature coil wires to the commutator.

Another object of the invention is to provide a commutator with minimal axial thickness.

A further object of the invention is to provide a commutator with a cylindrical sealing surface for contact with a mold during armature encapsulation.

A still further object of the invention is to provide a commutator with relatively thick tangs for armature coil electrical connections that can be heat staked.

A yet further object of the invention is to provide a face type commutator with rigid brush contact surfaces that are in a flat plane and produce minimal brush vibration.

Another further object of the invention is to provide an improved method of manufacturing an armature with a hat shaped conductor having a radially extending rim with at least one sealing surface for sealing contact with a mold during injection molding of the hub.

The commutator for an electric motor armature includes a hat shaped member with an axis of rotation. The hat shaped member is made from a conductive material such as a copper alloy. The hat shaped member includes a hollow cylindrical portion. One end of the cylindrical portion is closed by a plate like portion with a brush contact surface in a plane that is perpendicular to the axis of rotation of the commutator. The open end of the cylindrical member has an axially extending rim surface and a bottom surface. A plurality of tangs extend radially from the rim surface on the cylindrical member adjacent to the bottom surface. Each tang has a leg portion that is integral with the cylindrical member and extends radially from the rim surface. A foot portion is attached to the free end of the leg portion and extends circumferentially from the leg portion. The foot portions are generally spaced from the cylindrical member, have a surface that is in plane perpendicular to the axis of rotation of an armature and the foot portion extends further circumferentially to one side of the leg portion than to the other side of the leg portion to which each foot portion is attached.

A slot is provided in the cylindrical portion of the hat shaped member and extends from a point spaced from the brush contact surface through the rim surface and the bottom surface between adjacent tangs.

The inside of the cylindrical portion of the hat shaped member is filled by an injection molded plastic hub. The plastic material forming the plastic hub is a nonconductor which fills the slots in the cylindrical portion of the cup shaped member. A shaft passage for an armature shaft is provided in the center of the plastic hub and extends through the plate like portion of the hat shaped member.

The brush contact surface on the plate like portion of the cup shaped member is machined to produce a smooth flat brush contact surface. The outside surface of the cylindrical portion is machined from the brush contact surface to a point adjacent to the tangs on the rim surface of the cylindrical portion. The outside surface of the cylindrical portion is machined to make it smooth and concentric with an armature axis of rotation. Grooves in the hat shaped member divide the hat shaped member into a plurality of commutator collector segments each having a tang and a flat brush contact surface. Prongs are formed on the inside surface of the cylindrical portion of the hat shaped member and embedded in the plastic hub to secure the commutator segments to the plastic hub. The grooves in the hat shaped member are preferably formed by a cutter after the plastic hub is injection molded in the cup shaped member and cured.

Another feature of the invention is that the formed commutator has the tangs axially spaced from the brush contact surface to keep the armature coil wires that pass around the tangs out of the plane of the brush contact surface. During heat staking at least one of the free ends of the foot portion of each tang is heated and forced radially inward into contact with the rim surface of the hat shaped member.

A further feature of the invention is a cylindrical outer sealing surface on the outside surface of the hat shaped member between the brush contact surface and the tangs. During encapsulation of the armature in a plastic material to protect the armature coils from corrosion, a clam shell mold seals against the cylindrical outer sealing surface and plastic resin is pumped into the clam shell mold. After the resin is cured, the armature coils and the connections between the tangs on the commutator and the armature coil wires are completely encapsuled.

The forgoing and other objects, features and advantages of the present invention will become apparent in the light of the following detailed description of exemplary embodiments thereof as illustrated in the accompanying drawing.

BRIEF DESCRIPTION OF THE DRAWING

FIG. 1 is an enlarged top view of the commutator;

FIG. 2 is a vertical cross section taken along line 2—2 in FIG. 1;

FIG. 3 is a bottom view of the commutator before a hub is formed in the cavity;

FIG. 4 is an enlarged bottom view of one of the tangs;

FIG. 5 is a bottom view of an alternate tang;

FIG. 6 is a bottom view of a tapered tang that provides insulation displacement;

FIG. 9 is a vertical cross sectional view similar to FIG. 3 of a commutator with the prior art hook type tangs;

FIG. 10 is a bottom view of the hat shaped member before formation of slots and the formation of the insulator hub;

FIG. 11 is a bottom view of the hat shaped member after formation of slots and before formation of the insulator hub and before machining;

FIG. 12 is a cross sectional view of a mold and a commutator during formation of the insulator hub; and FIG. 13 is a plan view of a commutator showing material that is removed by machining operations in broken lines.

DETAILED DESCRIPTION OF THE PREFERRED EMBODIMENTS

Figure 7:
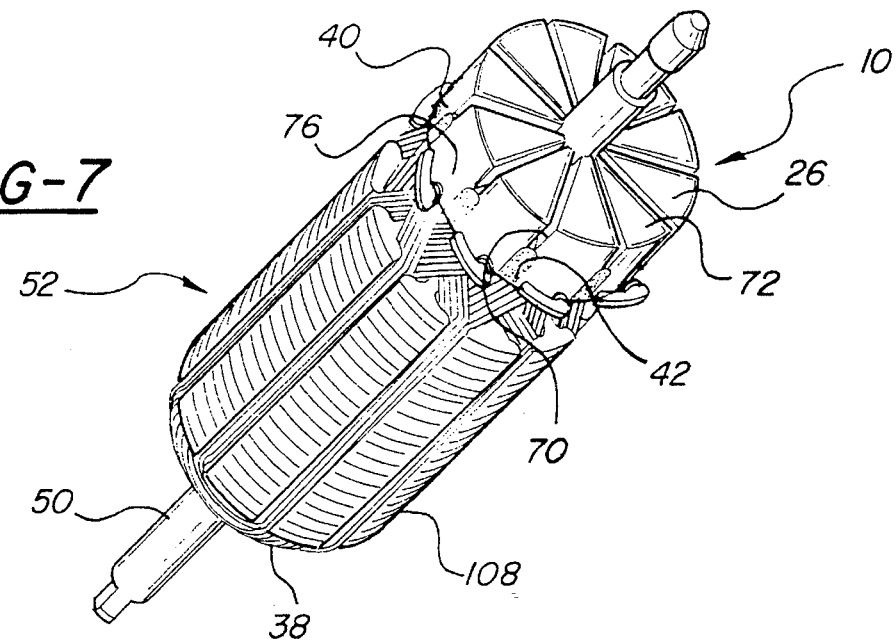
FIG. 7 is a perspective view of an armature with a commutator attached, prior to encapsulation.
Figure 8:
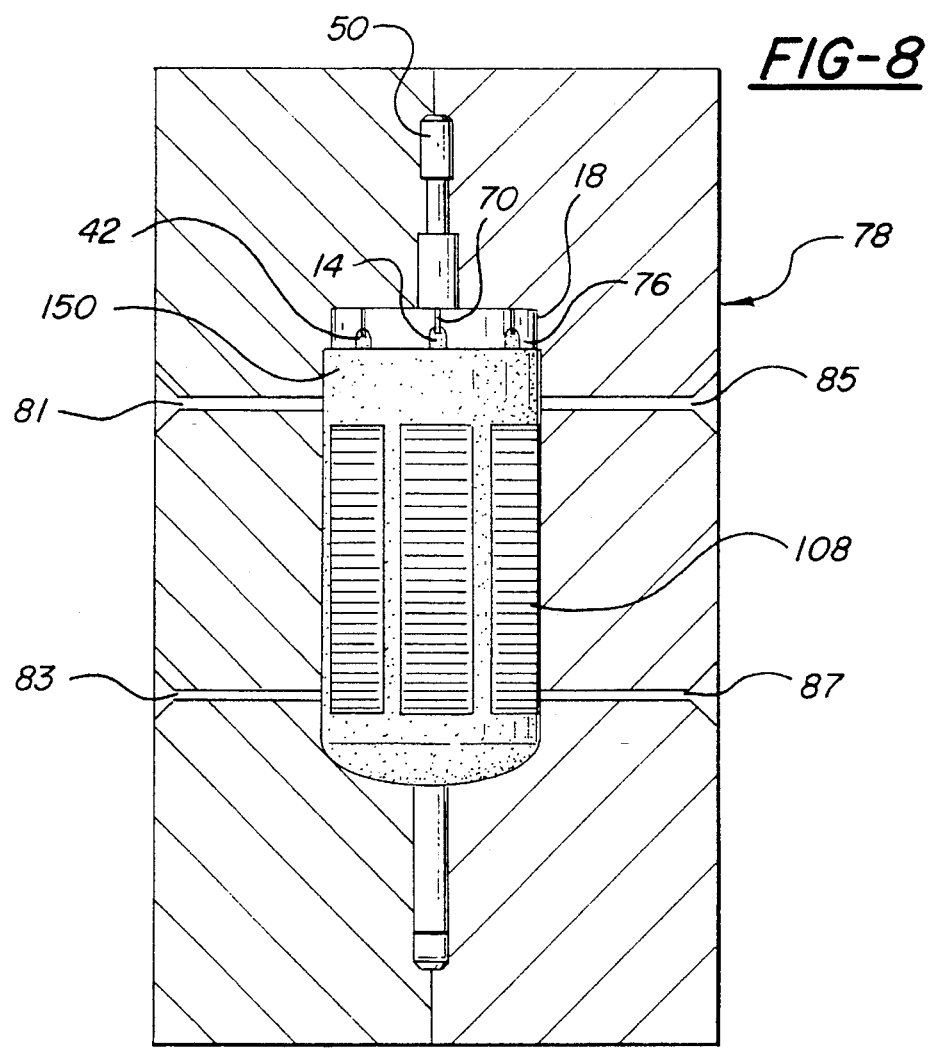
FIG. 8 is an elevational view of a mold with sections broken away to show an encapsulated armature.

The commutator is described herein with its axis of rotation being vertical and with the commutator above the armature windings of an armature. The upper surface of an element when in the position described above is the top. The lower surface of an element when in the position described is the bottom. The actual of the commutator and armature axis of rotation during use can be changed as required.

The commutator 10 includes a hat shaped member 12 and an insulator hub 14. The hat shaped member 12 has a cylindrical portion 16 with an outside surface 18 and an inside surface 20. The outside surface 18 and the inside surface 20 are both concentric with an armature axis of rotation 22. The top wall of the hat shaped member 12 is a plate portion 24 with a brush contact surface 26 at the top of the commutator 10. The brush contact surface 26 is a flat surface in a plane perpendicular to the armature axis of rotation 22. A cylindrical rim surface 28 is on the outside of the cylindrical portion 16. The cylindrical rim surface 28 is concentric with the armature axis of rotation 22 and between a top plane and a bottom plane that are axially spaced from and parallel to the brush contact surface 26.

A plurality of tangs 30 are attached to the cylindrical rim surface 28 on the outside surface 18 of the cylindrical portion 16 adjacent to the bottom surface 31 of the hat shaped member 12. The tangs 30 are axially spaced some distance from the brush contact surface 26 and are in a plane that is perpendicular to the armature axis of rotation 22. Eight tangs 30 are shown in FIGS. 1 and 13. The number of tangs may vary depending upon the design of the electric motor the commutator is used in. There could be more or a few less than eight tangs 30. Each tang 30 has a short radially extending leg portion 32 and a foot portion 34. The foot portion 34 has a short heel 36 that extends circumferentially counterclockwise a short distance from the leg portion 32 and a toe 37 that extends circumferentially clockwise from the leg portion as seen in FIG. 1. The leg portion 32 and the foot portion 34 extend radially from the cylindrical rim surface 28 and are in a common plane transverse to the armature axis of rotation 22. Armature coils 38 as shown in FIG. 7 have one or more wires 40 that loop around the leg portion 32 of each tang 30. The wires 40 are secured by heat staking the toe 37 of the foot portion 34 of each tang 30. The wires 40 can also be secured by welding. Insulation displacement, a third procedure for connecting wires 40 to the commutator 10 requires a special tang that is described below. The heat applied during heat staking or during welding removes insulation the wires 40 to create an electrical contact between the wires 40 and each of the tangs 30 for the transmission of electrical current.

A slot 42, shown in FIGS. 13 and 7, is provided in the wall of the cylindrical portion 16 of the hat shaped member 12 between each pair of adjacent tangs 30. The slots 42 are parallel to the armature axis of rotation 22, start near the plate portion 24 and extend through the bottom surface 43 of the cylindrical portion 16. A bore 44 is provided through the center of the plate portion 24 of the hat shaped member 12. The bore 44 is concentric with the armature axis of rotation 22. Radially inner prongs 66 are provided inside the hat shaped member 12 for anchoring the hub 14. Radially outer prongs 68 are also provided in the hat shaped member 12 for anchoring the hub 14. The prongs 68 can be narrow members, as shown in FIG. 3, or they can be relatively wide members that extend some distance along the inside surface 20, as shown in FIGS. 11 and 13.

The hat shaped member 12 is placed in a mold 134 and liquid resin is injected into the hat shaped member 12 through an injector 77 to form a hub 14, as explained below. The hub 14 fills the slots 42, the bore 44 and a cavity 46 defined by the inside surface 20 of the hollow cylindrical portion 16 and the plate portion 24. A bore 48 is formed in the center of the hub 14. The bore 48 is concentric with the armature axis of rotation 22 and smaller in diameter than the bore 44 through the plate portion 24 of the hat shaped member 12. The bore 48 can be round or any polygon shape. The bore 48, as shown in FIG. 1, has five flat side surfaces 54 that engage surfaces on the armature shaft 50. The corners where the flat side surfaces 54 join adjacent flat side surfaces provide space for adhesives that temporarily hold the commutator on the armature shaft 50. An odd number of side surfaces 54 are preferred. The portion of the bore 48, with five flat side surfaces 54 and the top 55 of the hub 14, is axially recessed a short distance from the brush contact surface 26 by a circular bore 56 that is larger in diameter than the bore 48. A circular bore 58, like the circular bore 56 is also provided in the bottom of the hub 14. The bore 48 with five flat side surfaces 54 and the circular bores 56 and 58 can be modified as required to receive armature shafts 50.

Recesses 60 and 62, shown in FIGS. 2 and 12, are provided in the bottom surface 64 of the hub 14 for engagement by tooling prongs during machining, forming and assembly operations.

The commutator 10 is placed in a machine tool, after hub 14 is formed within the hat shaped member 12, and the brush contact surface 26 of the plate portion 24 is machined to insure that it is in a plane perpendicular to the armature axis of rotation 22. The outside surface 18 of the cylindrical portion 16 is also machined between the brush contact surface 26 and the top of the tangs 30 and the cylindrical rim surface 28. This procedure insures that the outside surface 18 of the cylindrical portion 16 of the hat shaped member 12 between the brush contact surface 26 and the tangs 30 is concentric with the armature axis of rotation 22 and has the proper diameter. Machining the outside surface 18 of the cylindrical portion 16 also machines the portions of the hub 14 that project through the slots 42 above the tangs 30 and removes the arcuate portions 49, shown in FIGS. 3, 10 and 11. The arcuate portions 49 extend radially outward and close the slots 42 during injection molding of the hub 14.

Grooves 70 are formed in the plate portion 24 of the hat shaped member 12. The grooves 70 are sufficiently deep to cut through the brush contact surface 26 and the plate portion 24 and into the hub 14. The grooves 70 also extend into the slots 42 to electrically isolate each tang 30 from the other tangs. Each tang 30 is integral with one of the pie shaped collector segments 72 with a brush contact surface 26 separated by the grooves 70. The prongs 66 and 68 embedded within the hub 14 secure each pie shaped collector segment 72 and the tang 30 that is joined with the pie shaped collector segment to the hub 14.

The machined part of the outside surface 18 of the cylindrical portion 16 of the hat shaped member 12 above the tangs 30 and below the bottom 74 of the grooves 70 becomes a cylindrical sealing surface 76. The cylindrical sealing surface 76 makes sealing contact with a mold 78 during armature encapsulation. The cylindrical sealing surface 76 is axially spaced from the tangs 30 a distance that is slightly more than the diameter of two wires 40 to insure that the tangs and wires are fully encapsuled.

The tangs 30 are described above as having a radially extending leg portion 32 and a foot portion 34 with a short heel 36 and a long toe 37 that extend from the leg portion. The foot portion 34 is spaced from the cylindrical rim surface 28 of the hollow cylindrical portion 16 to form a long slot 80 and a short slot 82. The tang 84 shown in FIG. 5 could be used in place of the tangs 30. The tang 84 has a leg portion 86 that extends radially outward from the hollow cylindrical portion 16 and a cleat bar 88 with a center integral with the leg portion 86. The cleat bar 88 is spaced from the cylindrical rim surface 28 of the hollow cylindrical portion 16, generally parallel to a tangent to the cylindrical portion and forms two long slots 90 and 92. The cleat bar 88 and the leg 86 are in the same plane perpendicular to the armature axis of rotation 22 and parallel to and between a top plane perpendicular to the armature axis of rotation that includes the upper surface 142 and a bottom plane perpendicular to the armature axis of rotation that includes the bottom surface 132 of the rim portion 130. With the two long slots 90 and 92, both ends of the cleat bar 88 can be heat staked to the cylindrical rim surface 28 to secure wires 40.

A tang 94, as shown in FIG. 6, could be used in place of the tangs 30 or 84. The tang 94 has a leg 96 that extends radially from the outside surface 18 of the hollow cylindrical portion 16. A foot portion 98 is integral with the free end of the leg 96 and extends circumferentially outward from the leg 96 in a common plane with the leg that is perpendicular to the armature axis of rotation 22. The heel 100 of the foot portion 98 cooperates with the cylindrical rim surface 28 on the cylindrical portion 18 to form a short slot 102. The short slot 102 radially retains wires 40 from the armature coils 38 on the leg 96. The toe 104 of the foot portion 98 cooperates with the cylindrical rim surface 28 on the cylindrical portion 16 to form a long generally v-shaped slot 106. The base portion of the v-shaped slot 106 has a dimension along a line radial to the armature axis of rotation 22 that is less than the diameter of the wire 40 and its insulation coating. When a wire 40 is pulled into the base portion of the v-shaped slot 106, the insulation on the wire is mechanically displaced and an electrically conductive contact between the wire 40 and the tang 94 is created. The wire 40 is securely held in the v-shaped slot 106 thereby eliminating the need to weld or heat stake the tang 94 to hold the wire 40.

To manufacture the face type commutator 10 described above, a hat shaped member 12 is formed from a conductive material. The hat shaped member 12 has a plate portion 24, a hollow cylindrical portion 16 and a rim portion 130. An armature axis of rotation 22 passes through the center of the hat shaped member 12 with the hollow cylindrical portion 16 concentric with the armature axis of rotation. The plate portion 24 is integral with and closes the upper end of the hollow cylindrical portion 16. The flat brush contact surface 26 on the top of the plate portion 24 is in a plane perpendicular to the armature axis of rotation 22. The rim portion 130 of the hat shaped member 12 extends radially outward from the hollow cylindrical portion 16 and has an upper surface 142 and a bottom surface 132 that are in two spaced apart planes perpendicular to the armature axis of rotation 22. The rim portion 130 is spaced from the brush contact surface 26. The bottom surface 132 of the rim portion 130 is in the same bottom plane as the bottom surface 43 of the hollow cylindrical portion 16. However, the bottom surface 43 could be axially spaced from the bottom surface 132, if desired.

A bore 44, concentric with the armature axis of rotation 22, is formed in the plate portion 24. Slots 42 are formed in the walls of the cylindrical portion 16. The slots 42 extend from positions adjacent to the plate portion 24 through the bottom surface 43. The slots 42 also extend through the bottom surface 132. The slots 42 can be formed at the time the hat shaped member 12 is formed. The hat shaped member 12 can also be formed without the slots 42, as shown in FIG. 10, and the slots, as shown in FIG. 11, can be formed by a machining operation. Prongs 66 and 68 are formed in the cavity 46 in the hat shaped member 12 by skiving. The skiving operation occurred before the slots 42 were machined, as shown in FIGS. 10 and 11. The skiving operation to form the prongs 66 and 68 could occur after the slots 42 are formed.

The hat shaped member 12 is placed in a mold 134, shown in FIG. 12. One part 136 of the mold 134 closes the cavity 46 and makes sealing contact with surfaces 132 and 43 on the rim portion 130 and the cylindrical portion 16. Another part 140 of the mold 134 makes sealing contact with a sealing surface in the bottom of the circular bore 56. A shaft 151 can be inserted through the center of the mold 134 to form the bore 48 through the hub 14 or the bore can be formed by machining. The shaft 151 can be cylindrical, as shown in FIG. 12, or it can have multiple flat surfaces to provide the bore 48 with multiple side surfaces 54, as shown in FIG. 1.

A nonconductive plastic material is injected into the mold 134 through an injector 77 to fill the cavity 46, the slots 42 and form a hub 14.

The hat shaped member 12 and the hub 14 are removed from the mold 134 and transferred to a machine tool which machines the flat brush contact surface 26 to insure that the brush contact surface is in a plane perpendicular to the armature axis of rotation 22. The outside surface 18 of the cylindrical portion 16 and portions of the hub 14 that extends through the slots 42 are machined to remove the arcuate portions 49 and to insure that the outside surface and the hub 14 is concentric with the armature axis of rotation 22 and have the desired diameter from the brush contact surface to the rim portion 130 to form a cylindrical sealing surface 76.

Part of the rim portion 130 is removed by blanking or punching to form tangs 30, 84 or 94 to isolate the tangs from each other by removing the parts of the rim portion that cover the slots 42 and to form a cylindrical rim surface 28. The material shown in phantom lines in FIG. 13 is the material that is removed by blanking or punching to form the tangs 30 and the cylindrical rim surface 28. Grooves 70 are cut into the plate portion 24 to form pie shaped collector segments 72.

An armature 52 is made by inserting an armature shaft 50, with attached plates 108 and wire coils 38, in the bore 48 through a face type commutator 10. Leads or wires 40 from the coils 38 pass around the leg portion 32, 86 or 96 of the tangs 30, 84 or 94 and are radially restrained on the leg portions by the foot portions 34, 98 or cleat bar 88. The tangs 30 and the leads or wires 40 are welded, heat staked or insulation is displaced to form an electrical contact between the leads and the commutator 10 and to hold the leads on the commutator. If the tangs 30 are heat staked, the toe 37 can be forced axially upward a short distance as well as radially inward without interfering with the cylindrical sealing surface 76. Forcing the toe 37 or the free ends of a cleat bar 88 slightly upward during heat staking increases the strength of the connection between the commutator 10 and the wires 40. The armature 52 is encapsulated by placing the armature in a mold 78. The armature shaft 50 extends from both ends of the mold cavity in the mold 78. The bottom and top half of mold 78 make sealing contact with one end of the armature shaft 50 and with a machined cylindrical outside surface 18 on the face type commutator 10 between the tangs 30 and wires 40 that pass around the leg portion 32, 86 or 96 and the grooves 70. A plastic material is injected into the mold 78 through passages 81, 83, 85 and 87 to encase the armature coils 38 and the tangs 30 on the commutator 10.

A prior art commutator 110 is shown in FIG. 9. The prior art commutator has a conductor member 112, a hub member 114 and a plurality of tangs 116. Each tang 116 has a base portion 118 that extends radially outward and a free end 120 that extends radially outward and axially upward from the base portion at an angle. When the tang 116 is heat staked, the free end 120 is heated and deformed inwardly and upwardly until it joins a cylindrical outside surface 122 of the conductor member 112 above the base portion 118. The tangs 30, 84 and 94 require an axial space on a commutator that is the same as the axial height of the leg portion 32 of a tang plus the diameter of two wires 40. The tang 116, as shown in FIG. 9, requires substantially more axial space. The space for the tangs 116 is obtained by increasing the overall length of the armature or by decreasing the space between the commutator and the armature plates 108, shown in FIG. 7. Because the space between the armature plates 108 and the commutator 10 is filled by armature coils 38 and wires 40, the commutator 10 can be moved closer to the armature plates by decreasing the diameter of the wires 40 or by decreasing the number of wraps of wire in each armature coil. Both of these steps are obviously undesirable. Conversely, a decrease in the axial height of a commutator 10, made possible by the employment of the tangs 30, 84 or 94 described above make it possible to decrease the length of a motor, increase the diameter of the wire 40 or increase the number of wraps of wire in the armature coils 38. The tangs 30, 84 or 94 can also make it possible to increase the thickness of the plate 24 to increase armature life without increasing armature length.

Preferred embodiments of the invention have been described in detail but are examples only and the invention is not restricted thereto. It will be easily understood by those skilled in the art that modifications and variations can easily be made within the scope of this invention.

I claim:

1. A face type commutator including a hat shaped conductor with a plate member having a flat brush engaging surface and a central bore through the plate member;

an armature axis of rotation concentric with the central bore through the plate member and perpendicular to the flat brush engaging surface;

a hollow cylindrical member integral with the plate member and having a cylindrical outside surface that is concentric with the armature axis of rotation and that extends axially from the flat brush engaging surface, a bottom surface, an inside surface that cooperates with the plate member to form a cavity, a segmented cylindrical rim surface on the hollow cylindrical member spaced from the flat brush engaging surface and extending axially along a radially outer portion of the hollow cylindrical member;

a plurality of tangs angularly spaced about the armature axis of rotation for connecting armature coil wires to the commutator, each having a leg portion integral with the hollow cylindrical member and that extends radially outward from the segmented cylindrical rim surface and a foot portion that extends from a first side and a second side of the leg portion generally parallel to a plane perpendicular to the armature axis of rotation;

a slot through the hollow cylindrical member between every two adjacent tangs that extends from a position adjacent to the plate member through the bottom surface of the hollow cylindrical member;

a hub made from a non-conductive material, that is in the cavity formed by the plate member and the inside surface of the hollow cylindrical member and that is in the slots through the hollow cylindrical member, attached to the inside surface of the hollow cylindrical member and to the plate member and a shaft bore through the hub that is concentric with the armature axis of rotation;

grooves in planes parallel to the armature axis of rotation extending axially from the flat brush engaging surface through the plate member and into the slots through the hollow cylindrical member to electrically isolate each tang from the other tangs and to divide the flat brush engaging surface into a plurality of collector segments; and wherein the cylindrical outside surface of the hollow cylindrical member and the hub form a cylindrical sealing surface between the grooves and the tangs.

2. A face type commutator as set forth in claim 1 wherein the flat brush engaging surface is a machined surface.

3. A face type commutator as set forth in claim 1 wherein the cylindrical sealing surface is a machined surface.

4. A face type commutator as set forth in claim 1 wherein the flat brush engaging surface and the cylindrical sealing surface are machine surfaces.

5. A face type commutator as set forth in claim 1 wherein the foot portion of each of the tangs cooperate with the hollow cylindrical member to form a v-shape slot operable to remove an insulation cover from an insulated wire when the insulated wire is pulled into the v-shaped slot.

6. A face type commutator as set forth in claim 1 wherein the foot portion of the tangs extends circumferentially in one direction a sufficient distance to allow a free end to be displaced radially inward into contact with the cylindrical rim surface to retain an armature coil wire.

7. A face type commutator as set forth in claim 1 wherein the foot portion of the tang extends from the first side of the leg portion to a first free end and from the second side of the leg portion to a second free end a distance sufficient to allow the first and second free ends to be displaced radially inward and into contact with the cylindrical rim surface to retain an armature coil wire.

8. A face type commutator as set forth in claim 1 wherein the hub is made from a resin that is injected into the cavity inside the hat shaped member and into the slots through the hollow cylindrical member.

9. A face type commutator as set forth in claim 8 including a plurality of prongs inside said cavity projecting from the hat shaped conductor that anchor the conductor segments and the tangs to the hub.

10. A face type commutator including a hat shaped conductor with a plate member having a flat brush engaging surface and a central bore through the plate member;

an armature axis of rotation concentric with the central bore through the plate member and perpendicular to the flat brush engaging surface;

a hollow cylindrical member integral with the plate member and having a cylindrical outside surface that is concentric with the armature axis of rotation and extends axially from the flat brush engaging surface, a bottom surface, an inside surface that cooperates with the plate member to form a cavity, a rim surface on an outside of the hollow cylindrical member spaced from the flat brush engaging surface and extending axially along the outside of the hollow cylindrical member between the bottom surface and the cylindrical outside surface;

a plurality of tangs angularly spaced about the armature axis of rotation each having a leg portion that extends radially outward from the rim surface and a foot portion that extends from a first side and a second side of the leg and is generally parallel to a plane perpendicular to the armature axis of rotation;

a slot through the hollow cylindrical member between every two adjacent tangs that extend from a position adjacent to the plate member through the bottom surface of the hollow cylindrical member;

a hub made from a non-conductive material that is in the cavity formed by the plate member and the inside surface of the hollow cylindrical member and that is in the slots through the hollow cylindrical member, attached to the inside surface of the hollow cylindrical member and the plate member and a shaft bore through the hub that is concentric with the armature axis of rotation; and grooves in planes parallel to the armature axis of rotation extending axially from the brush contact surface through the plate member and into the slots through the hollow cylindrical member and that electrically isolate each tang from other tangs and divide the flat brush engaging surface into a plurality of collector segments.

\* \* \* \* \*

UNITED STATES PATENT AND TRADEMARK OFFICE
CERTIFICATE OF CORRECTION

PATENT NO. : 5,530,311
DATED : June 25, 1996
INVENTOR(S) : William E. Ziegler

It is certified that error appears in the above-identified patent and that said Letters Patent is hereby corrected as shown below:

Column 3, line 40, after "actual" insert -- orientation --.

Signed and Sealed this

Twenty-second Day of July, 1997

Attest:

BRUCE LEHMAN

Attesting Officer

Commissioner of Patents and Trademarks